(12) United States Patent
Balakrishnan et al.

(10) Patent No.: US 8,856,517 B2
(45) Date of Patent: Oct. 7, 2014

(54) ACCESS MANAGEMENT SYSTEM USING TRUSTED PARTNER TOKENS

(71) Applicant: Oracle International Corporation, Redwood Shores, CA (US)

(72) Inventors: Aarathi Balakrishnan, Bangalore (IN); Vikas Pooven Chathath, Bangalore (IN); Madhu Martin, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/686,543

(22) Filed: Nov. 27, 2012

(65) Prior Publication Data
US 2014/0149741 A1    May 29, 2014

(51) Int. Cl.
*H04L 9/32* (2006.01)
(52) U.S. Cl.
CPC .................................. *H04L 9/3213* (2013.01)
USPC ......................................................... 713/159
(58) Field of Classification Search
None
See application file for complete search history.

(56) References Cited

U.S. PATENT DOCUMENTS

| 7,327,258 | B2 | 2/2008 | Fast et al. | |
| 7,953,979 | B2 * | 5/2011 | Borneman et al. | 713/175 |
| 2006/0059546 | A1 | 3/2006 | Nester et al. | |
| 2009/0125972 | A1 | 5/2009 | Hinton et al. | |
| 2010/0135491 | A1 * | 6/2010 | Bhuyan | 380/247 |
| 2012/0011578 | A1 * | 1/2012 | Hinton et al. | 726/8 |

FOREIGN PATENT DOCUMENTS

EP    1089516 A2 *  4/2001

OTHER PUBLICATIONS

Easy integration with leading identity stores, http://www.netiq.com/products/access-manager/integrate.asp.
IBM Tivoli Access Manager Access Manager for Enterprise Single Sign-On 8.0, http://www.redbooks.ibm.com/redbooks/pdfs/sg247350.pdf.

(Continued)

*Primary Examiner* — Jeffrey Pwu
*Assistant Examiner* — Wasika Nipa
(74) *Attorney, Agent, or Firm* — Kilpatrick Townsend & Stockton LLP

(57) ABSTRACT

A method of using an access manager server to establish a communication session between a resource and a user device may include receiving a request from the user device to access the resource, determining that the client system is registered as a trusted partner, sending the client system a first encrypted token that includes a resource identifier where the client system has access to a first cryptographic key that decrypts the first encrypted token. The method may also include receiving a second encrypted token that signifies that access to the resource has been granted by the client system where the second token comprises a user identifier and the access manager server has access to a second cryptographic key that decrypts the second token. The method may additionally include decrypting the second token and establishing the communication session between the user device and the resource using the user identifier.

14 Claims, 10 Drawing Sheets

(56) References Cited

OTHER PUBLICATIONS

Identity & Access Management Solutions, http://www.i-sprint.com/download/doc/DataSheet-Overview.pdf.
Omada Identity Suite, http://www.omada.net/omada-identity-suite-417.aspx.
Ping Federate as an IdM suite federation alternative, http://go4idm.blogspot.in/2011/01/pingfederate-as-idm-suite-federation.html.
RSA Federated Identity Manager, http://india.emc.com/security/rsa-identity-and-access-management/rsa-federated-identity-manager.htm.
Sun Identity Manager, http://www.entrust.com/partners/solutions/119.htm.
U.S. Appl. No. 13/686,543, Patent Search mailed on Oct. 14, 2013.

* cited by examiner

ACCESS MANAGEMENT SYSTEM USING TRUSTED PARTNER TOKENS

BACKGROUND

Access management is critical to any effective identity and security strategy, but the complex nature of access management continues to challenge Information Technology (IT) departments. Securing access to a diverse set of applications, services and data is particularly complex given the expansive nature of Internet technologies. The emergence of cloud computing, mobile computing, and social identity technologies has only heightened the need for access controls, because these technology trends are transforming the way organizations access and expose business critical services and data.

As access management requirements have evolved, IT departments have often deployed a mix of point solutions, each of which met some critical requirement for application and information security. This patchwork of access management technologies has left IT with highly complex environments to manage, stretching IT resources and budgets and hindering the ability of IT to meet the needs of the business. With urgent demands for new IT services, departments in many organizations bypass IT altogether. The concept of "Shadow IT," often associated with Software-as-a-Service, is causing major security and governance concerns for organizations.

Over the past 15 years, the market has produced a collection of point products for access management, which operate independently to fulfill specific access requirements for each protected domain or resource. However, such an independent approach is not viable to satisfy requirements for Enterprise Software Systems of the future, which are demanding increased interoperability to achieve a seamless experience. In many areas, this change is being driven by the advent of cloud and mobile computing, which has transformed the way organizations access and expose business-critical applications, services, and data. Additionally, pressure to leverage social identities is taxing traditional access management deployments and highlights the need for improvements in the art.

BRIEF SUMMARY

In one embodiment, a method of using an access manager server to establish a communication session between a resource and a user device may be presented. The method may include receiving a request from the user device to access the resource. The request may be received by the access manager server, and access to the resource may be controlled at least in part by a client system. The method may also include determining that the client system is registered with the access manager as a trusted partner, and sending the client system a first encrypted token. The first encrypted token may include a resource identifier, and the client system may have access to a first cryptographic key that decrypts the first encrypted token. The method may additionally include receiving from the client system a second encrypted token. The second encrypted token may signify that access to the resource has been granted by the client system, the second encrypted token may include a user identifier, and the access manager server may have access to a second cryptographic key that decrypts the second encrypted token. The method may further include decrypting the second encrypted token and establishing the communication session between the user device and the resource using the user identifier.

In one embodiment, the method may further include receiving a registration transmission from the client system where the registration transmission comprises a client system identifier, sharing information associated with the first cryptographic key and the second cryptographic key with the client system, and registering the client system as a trusted partner. In one embodiment, the method may additionally include receiving a second request from the user device to access a second resource where access to the second resource is controlled at least in part by a second client system, determining that the second client system is registered with the access manager as a trusted partner, sending the second client system a third encrypted token, receiving from the second client system a fourth encrypted token where the fourth encrypted token signifies that access to the second resource has been granted by the second client system, decrypting a the fourth encrypted token, and establishing a communication session between the user device and the second resource. In another embodiment, the method may also include redirecting the user device to the resource after the communication session has been established.

In one embodiment, the client system may receive user credentials from the user device and authenticate a user identity associated with the user device. The first cryptographic key and the second cryptographic key may comprise a same symmetric cryptographic key. The first cryptographic key and the second cryptographic keys may each be part of a public/private key pair. The first encrypted token may further comprise an authentication level. The first encrypted token further may comprise a time associated with the request. The second encrypted token may further comprise an email address. The client system may comprise a fraud detection server. The client system may comprise an identity management server. The client system may comprise a social network.

In one embodiment, the client system may comprise a software module that is a part of an Enterprise Software System (ESS), where the access manager server may be a part of the same ESS. In another embodiment, the access manager server may be a part of an ESS, where the client system is not a part of the ESS, and where the client system is geographically remote from the access manager server.

In another embodiment, a computer-readable memory may be presented. Then computer-readable memory may have stored thereon a sequence of instructions which, when executed by one or more processors, causes the one or more processors to use an access manager server to establish a communication session between a resource and a user device. The instructions may cause the processor(s) receive a request from the user device to access the resource. The request may be received by the access manager server, and access to the resource may be controlled at least in part by a client system. The instructions may also cause the processor(s) to determine that the client system is registered with the access manager as a trusted partner, and send the client system a first encrypted token. The first encrypted token may include a resource identifier, and the client system may have access to a first cryptographic key that decrypts the first encrypted token. The instructions may additionally cause the processor(s) to receive from the client system a second encrypted token. The second encrypted token may signify that access to the resource has been granted by the client system, the second encrypted token may include a user identifier, and the access manager server may have access to a second cryptographic key that decrypts the second encrypted token. The instructions may further cause the processor(s) to decrypt the second encrypted token and establishing the communication session between the user device and the resource using the user identifier.

In yet another embodiment, a system may be presented. The system may include one or more processors and a memory communicatively coupled with and readable by the one or more processors. The memory may have stored therein a sequence of instructions which, when executed by the one or more processors, cause the one or more processors to use an access manager server to establish a communication session between a resource and a user device. The instructions may cause the processor(s) receive a request from the user device to access the resource. The request may be received by the access manager server, and access to the resource may be controlled at least in part by a client system. The instructions may also cause the processor(s) to determine that the client system is registered with the access manager as a trusted partner, and send the client system a first encrypted token. The first encrypted token may include a resource identifier, and the client system may have access to a first cryptographic key that decrypts the first encrypted token. The instructions may additionally cause the processor(s) to receive from the client system a second encrypted token. The second encrypted token may signify that access to the resource has been granted by the client system, the second encrypted token may include a user identifier, and the access manager server may have access to a second cryptographic key that decrypts the second encrypted token. The instructions may further cause the processor(s) to decrypt the second encrypted token and establishing the communication session between the user device and the resource using the user identifier.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
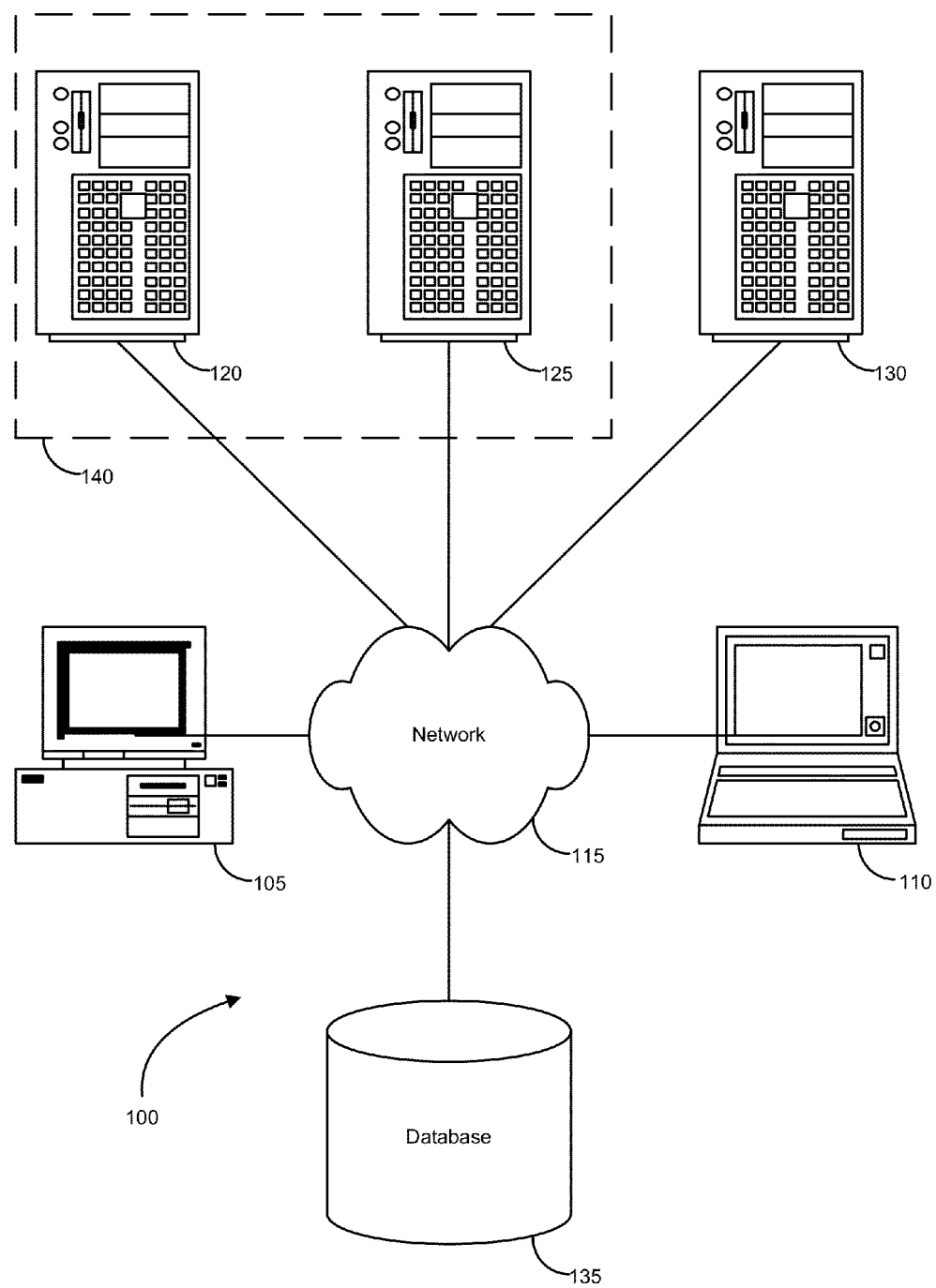
FIG. 1 illustrates a block diagram of components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Described herein, are embodiments for integrating an access manager with other software systems to carry out distributed authentication. In some embodiments, the other software systems may be additional software products within a single Enterprise Software System. In other embodiments, the other software systems may be third-party products, such as identity federations, social networks, and/or the like. The access manager uses a trusted authentication protocol mechanism where authentication responsibilities are delegated to client systems. Instead of locally authenticating users at the access manager server, the access manager leverages the client to collect credentials and perform the authentication at the client end.

A client can be registered as a trusted partner with the access manager. During the registration process, cryptographic information can be generated and shared between the access manager and the client, and additional information regarding the client can be provided to the access manager. The additional information may include a token version and a client name or identifier. This registration process can be easily achieved by running a single command within a script-interpreting window on the client side. Embodiments herein describe a new authentication scheme that leverages this trusted partner status of the client.

Prior to this disclosure, some identity management systems included an access manager acting as a gatekeeper, along with various other software products, such as an identity repository, a fraud detection system, access lists, and/or the like. The access manager acted as the central hub for protecting resources and providing authentication and authorization capabilities. In other words, the access manager server was responsible for collecting credentials and establishing user identities against an identity store.

Integration with the additional software products in the identity management system was not uniform. Each product within traditional identity management systems had its own mechanism and approach for interfacing with the access manager. Thus these mechanisms could not be reused or consistently determined across the range of products available. Each integration path was different between the access manager and the respective product. Additionally, some products were very agent specific, and thus would only work with certain access manager agents. Even though single sign on capabilities were available, these capabilities could not be fully leveraged using the access manager. This is been discovered to be a severe disadvantage, in that there was no uniform and consistent means of integrating all possible client products with an access manager for identity authentication. This included the difficulty of integrating with third-party products.

As described herein, by first recognizing registered clients as trusted partners, cryptographic information can be exchanged between the access manager and a client that can later be used for authentication. When the access manager receives an authentication request for a resource, the request can be redirected to the client system that has responsibility of collecting user credentials and authenticating the user. The client system can then request, verify, and authenticate the user credentials and return a cryptographically secure token to the access manager using the previously-exchanged cryptographic information. The access manager can then assert the user identifier received from the token. Once asserted, the access manager can establish a communication session between the requested resource and the access manager. This session can be a single sign-on (SSO) session, which thereafter allows resources to be accessed without needing to re-authenticate the user.

One advantage realized by particular embodiments described herein is an increase in the modularity and compatibility of software systems with the access manager. Each client system can have its own authentication and credential verification procedure. However, the access manager does not need to know how a client system verifies credentials, or even what credentials are required. A uniform system is instead established that can be applied to any new client system. Thus, clients can be added in plug-and-play fashion without needing to update the access manager interface.

Each of the embodiments disclosed herein may be implemented in a computer system. FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
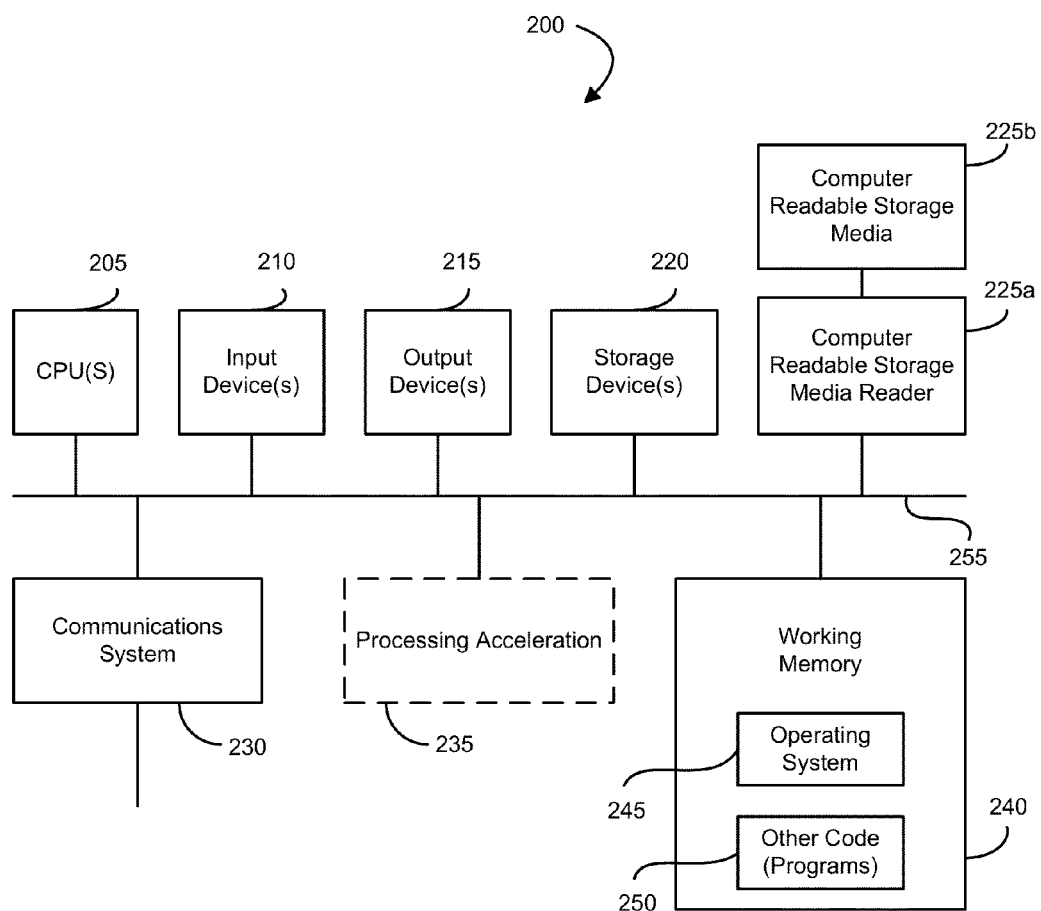
FIG. 2 illustrates a block diagram of an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Each of the methods described herein may be implemented by a computer system, such as computer system 200 in FIG. 2. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Therefore, it will be understood in light of this disclosure, that each step and each method described herein may be altered to include an input and output to and from a user, or may be done automatically by a computer system. Furthermore, some embodiments of each of the methods described herein may be implemented as a set of instructions stored on a tangible, non-transitory storage medium to form a tangible software product.

Figure 3:
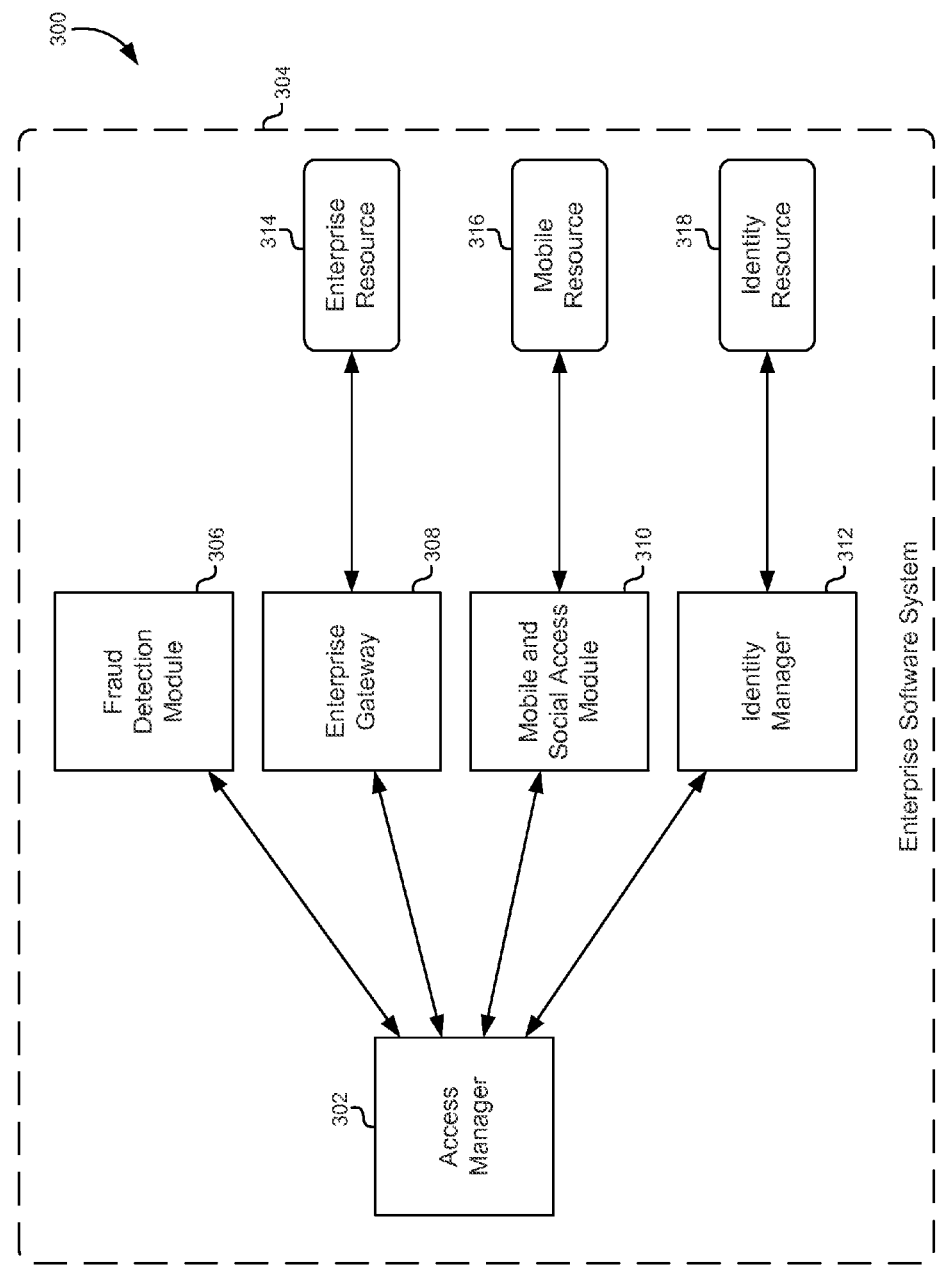
FIG. 3 illustrates a block diagram of a system using access manager, according to one embodiment.

FIG. 3 illustrates a block diagram 300 of a system using an access manager, according to one embodiment. In this embodiment, all of the software/hardware modules involved reside within a single Enterprise Software System 304. An access manager 302 acts as a gateway for all incoming requests to access services and resources residing within the Enterprise Software System 304. The access manager 302 may receive requests from other computer systems within the Enterprise Software System 304, as well as requests from external computer systems.

When a request is first received by the access manager 302 a determination may be made as to whether the particular resource and/or service requires authentication. In some embodiments, the access manager 302 can keep track of which client systems protect certain resources and/or services. In other embodiments, the access manager 302 may simply forward the request to a client system in order to determine whether or not the resource requires some form of identity verification/authentication.

It will be understood that the client systems illustrated in FIG. 3 are merely exemplary. Additional client systems may also be available depending on the particular implementation of the Enterprise Software System 304. In this particular embodiment, a fraud detection module 306 may be communicatively coupled to the access manager 302. The fraud detection module 306 may be implemented using a commercially available product, such as the Oracle® Adaptive Access Manager. The fraud detection module 306 can monitor authentication requests sent from the access manager 302 in order to detect patterns that indicate fraud, attacks, vulnerabilities, and/or the like.

If the access manager 302 receives a request for an Enterprise resource 314, the access manager can forward the request to the Enterprise gateway 308 because the Enterprise resource 314 may be protected by an authentication scheme that is set to forward the request. First, the access manager 302 can determine whether the Enterprise gateway 308 is registered with the access manager 302 as a trusted partner. If the Enterprise gateway 308 is registered as a trusted partner, then one or more cryptographic keys may have previously been exchanged between the access manager 302 and the Enterprise gateway 308. These cryptographic keys may be used to create trusted partner tokens that encapsulate data associated with the request that you be passed from the access manager 302 to the Enterprise gateway 308. The Enterprise gateway 308 can then request and receive credentials from the user device, verify those credentials, and pass an encrypted token back to the access manager 302 that indicates that the credentials were authenticated and that the requesting device may receive access to the Enterprise resource 314. The access manager 302 can then assert the user identity received from the token and then establish a communication session between the user device and the Enterprise resource 314 through the Enterprise gateway 308 such that the requested access is granted.

The process described above will be described in greater detail below in this disclosure. It should be noted that using trusted partner status during the authentication process may be entirely transparent to the requesting device such that a user is not aware that an entity other than the access manager 302 is requesting and verifying credentials. In another embodiment, a an indication may be provided to the requesting device describing exactly which client system is authenticating its credentials. Alternatively, an indication could be provided that the Enterprise gateway 308 is handling the authentication procedure.

In addition to the Enterprise resource 314, many other types of resources may be accessible through the access manager 302. Merely by way of example, a mobile resource 316 may be available through a mobile and social access module 310. The mobile and social access module 310 may provide resources to mobile devices and may also interface with social networks. Additionally, and identity manager 312 may provide access to the identity resource 318, such as a user profile and the various types of information that may be stored therein.

Figure 4:
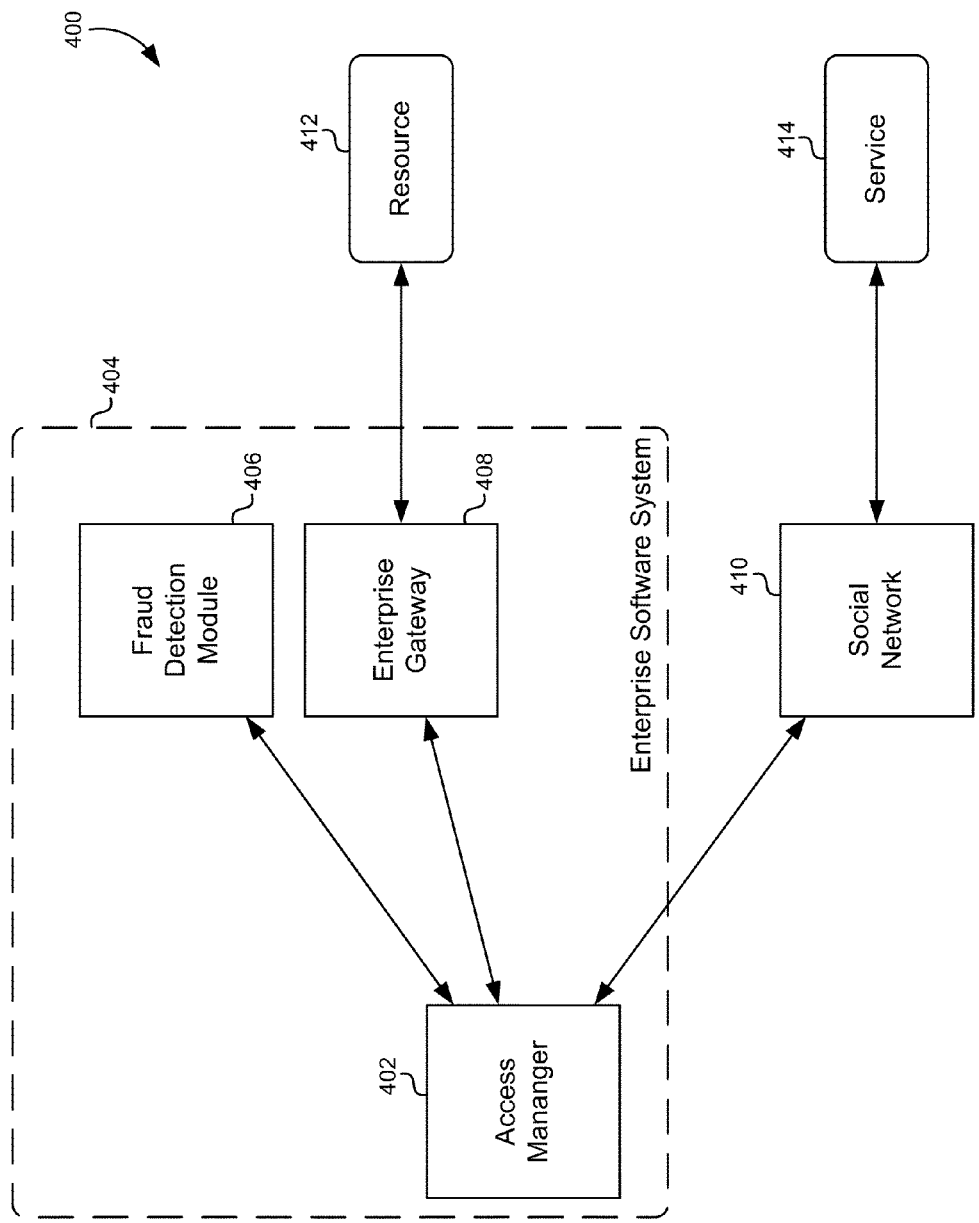
FIG. 4 illustrates another block diagram of a system using an access manager, according to one embodiment.

FIG. 4 illustrates another block diagram 400 of a system using an access manager, according to one embodiment. In this case, the access manager 402 may continue to interact with client systems within the Enterprise Software System 404. For example, the fraud detection module 406 and the Enterprise gateway 408 may be interfaced in the manner described above.

In addition to client systems within the Enterprise Software System 404, the access manager 402 may provide access to additional resources that reside outside of the Enterprise Software System 404. For example, the access manager 402 may provide access to a particular service 414 available through a social network 410. Prior to this disclosure, the access manager 402 would need to perform an identity authentication as required by the social network 410 in order to access the service 414. Therefore, the access manager 402 would need to be privy to the working details of the authentication scheme required by the social network 410. In contrast, embodiments herein forward the request from the access manager 402 to the social network 410. As a trusted partner, the social network 410 can provide an encrypted token to the access manager 410 that signifies that access has been granted to the service 414, thus eliminating the need for the access manager 402 to understand the authentication procedures required by the social network 410.

Additionally, some resources that are external to the Enterprise Software System 404 may still be accessed through client systems that reside within the Enterprise Software System 404. By way of example, resource 412 may reside external to the Enterprise Software System 404, yet still be protected by the Enterprise gateway 408 (or another Enterprise client system).

Figure 5:
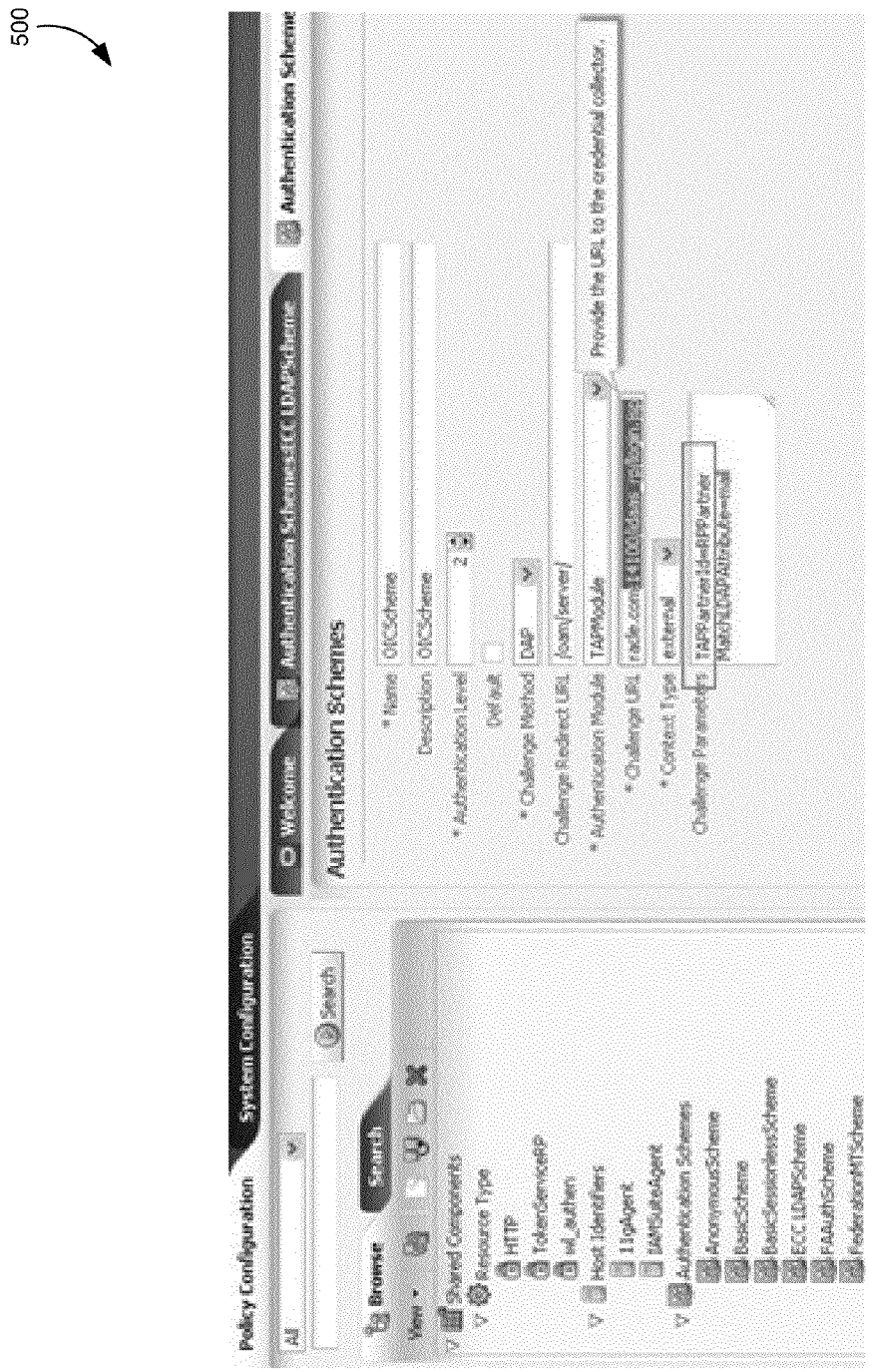
FIG. 5 illustrates an interface, according to one embodiment.

Another benefit provided by the trusted partner status of various client systems involves the reuse of authentication schemes. An authentication scheme may include a name, a description, an authentication level, a challenge method, a challenge redirect URL, an authentication module, a challenge URL, a content type, and/or other challenge parameters. FIG. 5 illustrates an interface 500 for defining authentication schemes, according to one embodiment. Here, a security administrator can use the access manager to apply authentication schemes to various trusted partners.

When a client is registered as a trusted partner with the access manager, a secret key can be generated by the access manager server and shared between the two parties. Additionally, a token version counter and a partner name may be specified by the registration procedure. In one embodiment, each trusted partner authentication can use the same authentication scheme. In this case, the trusted partner authentication scheme can add a trusted partner ID to the challenge parameters shown in interface 500. Thus, a list of trusted partners can be maintained centrally by the access manager server. In some embodiments, the trusted partner can be treated like any other agent (such as Oracle® 10g/11g Webgate) registered with the access manager server. Therefore, the trusted partner registration and cryptographic information specifics can be maintained centrally by the access manager server.

Figure 6:
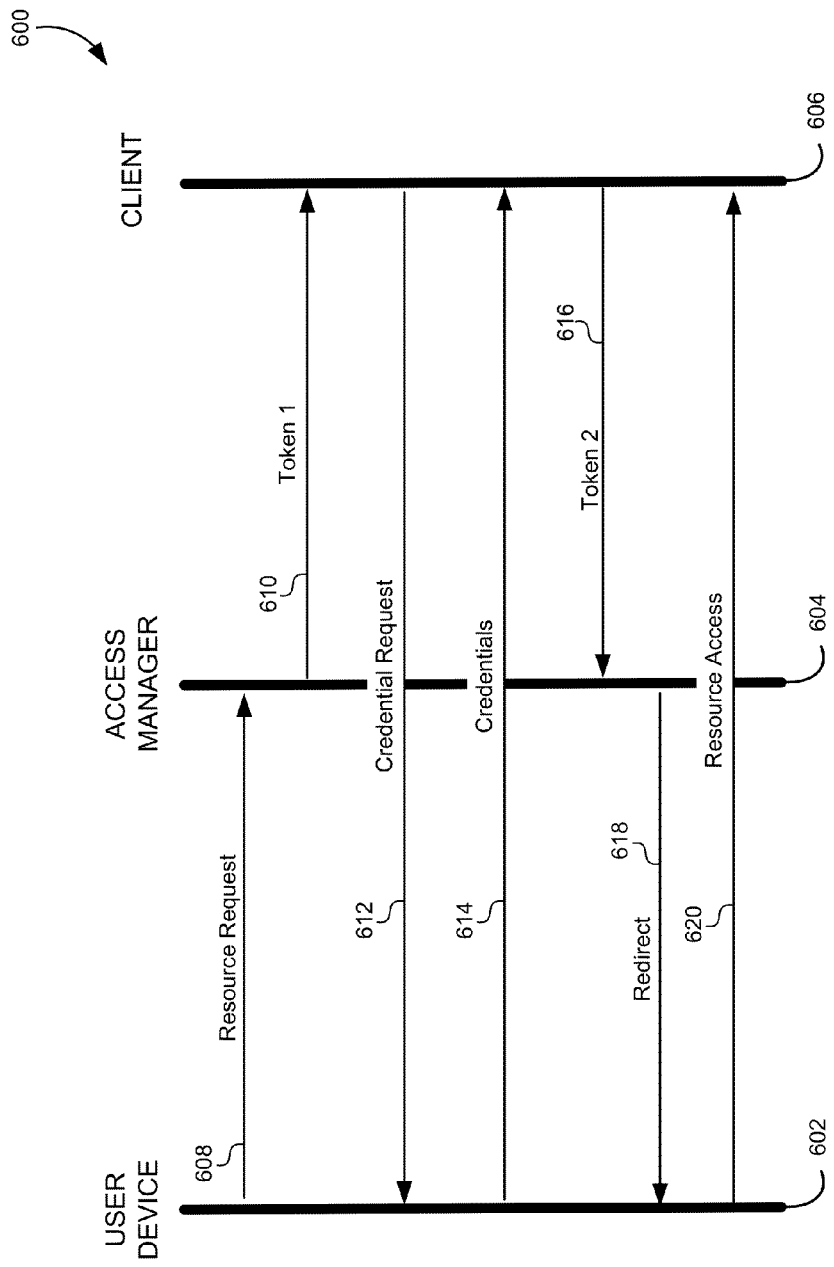
FIG. 6 illustrates a flow diagram for distributed authentication, according to one embodiment.

FIG. 6 illustrates a flow diagram 600 for distributed authentication, according to one embodiment. First, a user device can request access to a resource (608). The request may be received by an access manager that is part of an Enterprise Software System. The user device may include a smart phone, a PDA, a tablet computer, a notebook computer, desktop computer, a server, a thin client, and/or any other computing resource. The request may be initiated by a human user, or may alternatively be initiated by an automated software process operating on the user device. The request may be a one-time event, or may be a periodic request that is repeated at regular intervals or when a triggering event occurs.

The access manager can then create an encrypted token that is forwarded to a protecting client (610). In some embodiments, this encrypted token may be referred to herein as a first encrypted token. The first encrypted token may include information that identifies the resource requested, and may also include information associated with the user device or with a requesting user identity. In some embodiments, when a resource protected by a trusted partner is requested, the access manager 604 can redirect the user device 602 to the client 606, where the client can act as the credential collector. In one embodiment, this may involve redirecting a web browser to a specific URL associated with the client 606. The first cryptographic token may be encrypted using a cryptographic key that was shared between the access manager 604 and the client 606 during the registration process.

The client 606 can receive the first cryptographic token, decrypt the token using an exchanged cryptographic key, and use the information contained therein to request credentials from the user device 602 (612). In one embodiment, the client 606 may determine a particular resource that is being requested using the encrypted information in the first cryptographic token and make a determination as to whether credential authentication is required. The client 606 may also determine an authentication level that is based on the particular resource. In another embodiment, the authentication level may be specified by the access manager 604 and communicated within the first cryptographic token.

In response, the user device 602 can provide credentials to the client 606 (614). The client 606 may then verify/authenticate the provided credentials and make a determination as to whether the user device 602 should be granted access to the requested resource. If access is determined to be granted, the client 606 may package information indicating that the authentication was successful into another token to be sent to the access manager 604 (616). As used herein, the second token may be referred to as a second cryptographic token. The second cryptographic token may include user information, such as a username, a user identifier, and e-mail address, and/or other similar information.

After receiving the second cryptographic token, the access manager 604 can use a username received in the second cryptographic token to grant access to the resource. In one embodiment, the access manager 604 can decrypt the second cryptographic token and assert the username received. After this, the access manager can create a user session, or communication session, with the user device 602. In one embodiment, this may involve using and setting an access manager cookie. This may enable single sign-on capabilities to be achieved with this type of integration. In this delegated mode, the access manager 604 trusts client 606. After decrypting the token successfully, the access manager 604 can simply assert the user received in the token. Thus the authentication can be fully performed at the client 606.

One particular usage scenario may involve integration with a relying party. The relying party can provide an infrastructure that enables a website or service provider to use various Internet-based authentication systems to provide secure access to various resources. The relying party can be registered as a trusted partner with the access manager 704. When a resource is accessed, the access manager redirects to the relying party with an encrypted token for authentication. The relying party can communicate with a selected IDP, such as Google® or Yahoo®, to authenticate the user. After authentication, the relying party can create the second encrypted token with the user name and certain user attributes, such as an e-mail, a display name, etc., and submit this information back to the access manager. The access manager can then assert the user based on a configurable attribute and create the user session.

Figure 7:
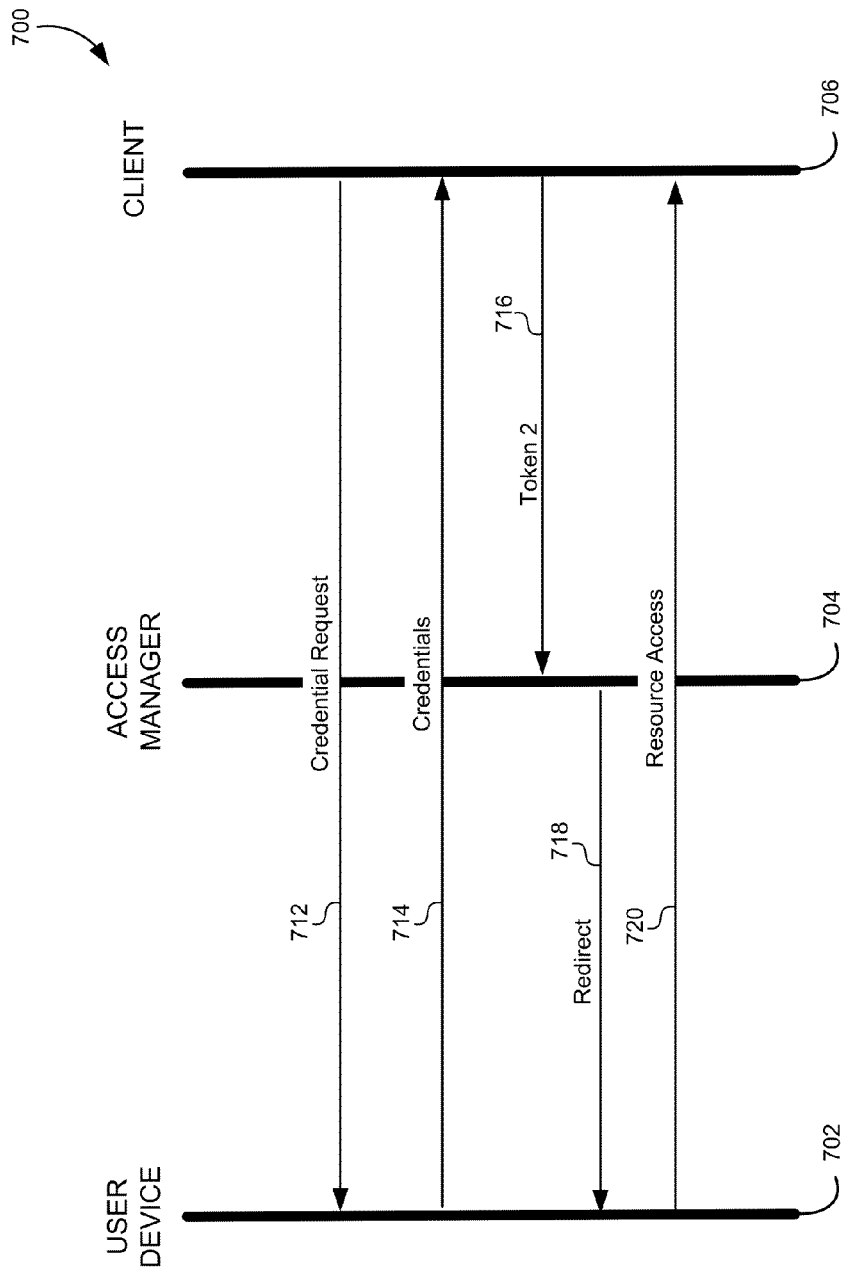
FIG. 7 illustrates another flow diagram for distributed authentication, according to one embodiment.

FIG. 7 illustrates another flow diagram 700 for distributed authentication, according to one embodiment. The embodiment related to flow diagram 700 may be referred to as a response-only scenario. In this embodiment, the client does some processing and submits the encrypted tokenized response to the access manager server without requiring a request to first be sent from the access manager. In other words, the authentication flow may be initiated by the client rather than by the access manager.

This response-only flow may have a separate authentication scheme stored at the authentication manager, such as a "TAPResponseOnlyScheme." This scheme may have a fixed authentication level that is used to assert the username that is received from the client. After the session is created, the user can be redirected to the protected resource. The response-only flow is secure because the authentication manager has a fixed authentication level for such transactions.

For example, when the user changes a password associated with the client 706, this transaction need not initially go through the access manager 704. The client 706 can send a request for information or credentials to the user device 702 (712). Subsequently, the user device 702 can respond by sending the credentials or information to the client 706 (714). When the credentials are successfully authenticated, the client 706 may package user, resource, and/or session information inside an encrypted token (still referred to as the second cryptographic token) and send the token to the access manager 704 (716). The access manager 704 may then redirect the user device 702 to a URL associated with the client 706 (718). Finally, the user device 700 can access the requested resource through the client 706 as a part of the established communication session (720).

Figure 8:
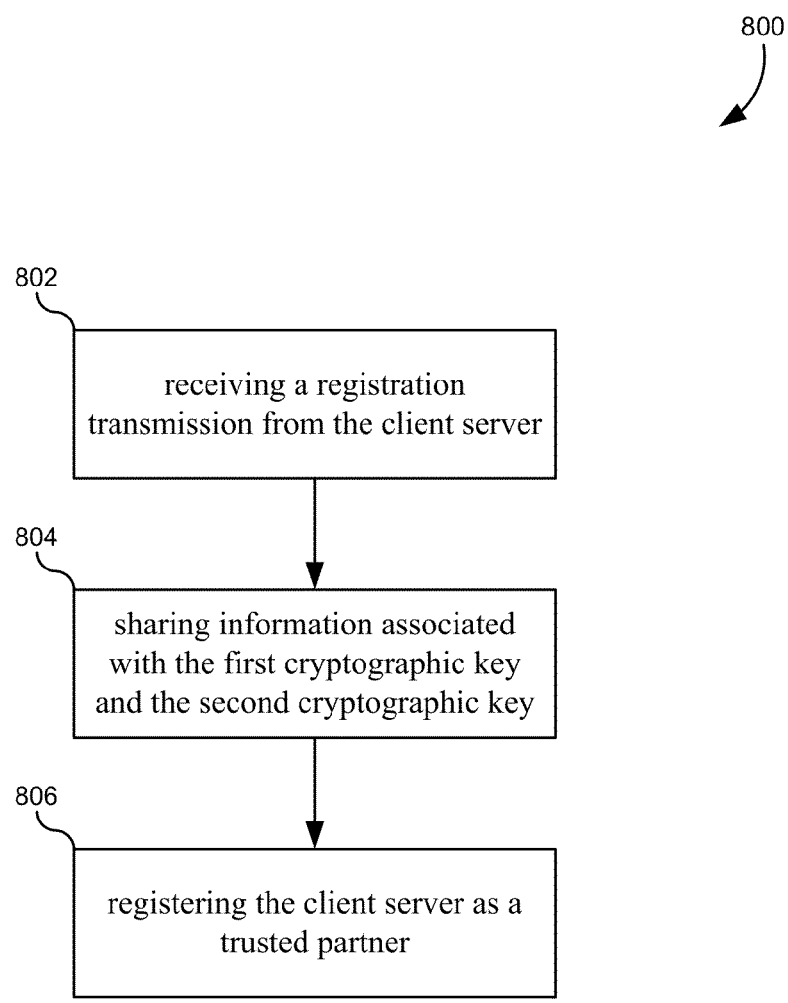
FIG. 8 illustrates a flowchart for a method of registering a trusted partner, according to one embodiment.

FIG. 8 illustrates a flowchart for a method of registering a trusted partner, according to one embodiment. The method may include receiving a registration transmission from a client system (802). In one embodiment, the registration process may involve a simple command received by a command-line scripting interface used to manage server instances and domains. For example, the Oracle® WebLogic Scripting Tool may accept a single command in a scripting language, such as Jython, in order to register the client system. In some cases, the access manager server may send a request for registration information to the client system. In other cases, the client system may send registration information to the access manager without requiring a prior request. The registration transmission may be carried out over a secure communication channel using known methods.

In response to receiving a registration transmission, the method may further include sharing information associated with a first cryptographic key and with a second cryptographic key between the access manager server and the client system (804). Sharing this information may take many forms, depending upon the particular embodiment. In one embodiment, the access manager server may generate a single cryptographic key that can be used to share information between the access manager server and the client system. For example, the cryptographic key may be a symmetric encryption key. In this embodiment, the first cryptographic key and the second cryptographic key may comprise the same cryptographic key. When the access manager server generates the symmetric encryption key, the access manager server can manage cryptographic information for each of the client systems that are registered as trusted partners. Therefore, each registered trusted partner may have its own symmetric encryption key. The trusted partner's name can be used to look up the correct encryption key. In an alternative embodiment, each client system registering as a trusted partner could provide a cryptographic key to the access manager server. Therefore, sharing the information may comprise a one-sided transaction, where a cryptographic key is passed from the access manager server to the client system, or vice versa.

Other embodiments need not use a single symmetric encryption key. For example, each of the access manager server and the client system may be associated with a unique public/private cryptographic key pair. In this case, sharing the information during the registration process may comprise exchanging public key information such that tokens encrypted by the access manager server's public encryption key by the client system can be decrypted using the access manager server's private encryption key by the access manager server, and vice versa. In this case, sharing the cryptographic information may include two-way transactions between the access manager server and the client system.

The method may further include registering the client/server as a trusted partner (806). As a part of the registration process, the access manager server may add a client system identifier to a list of trusted partners. Additionally, the access manager server may add the client system identifier to a particular authentication scheme or protocol that is used to establish user sessions involving trusted partners.

Figure 9:
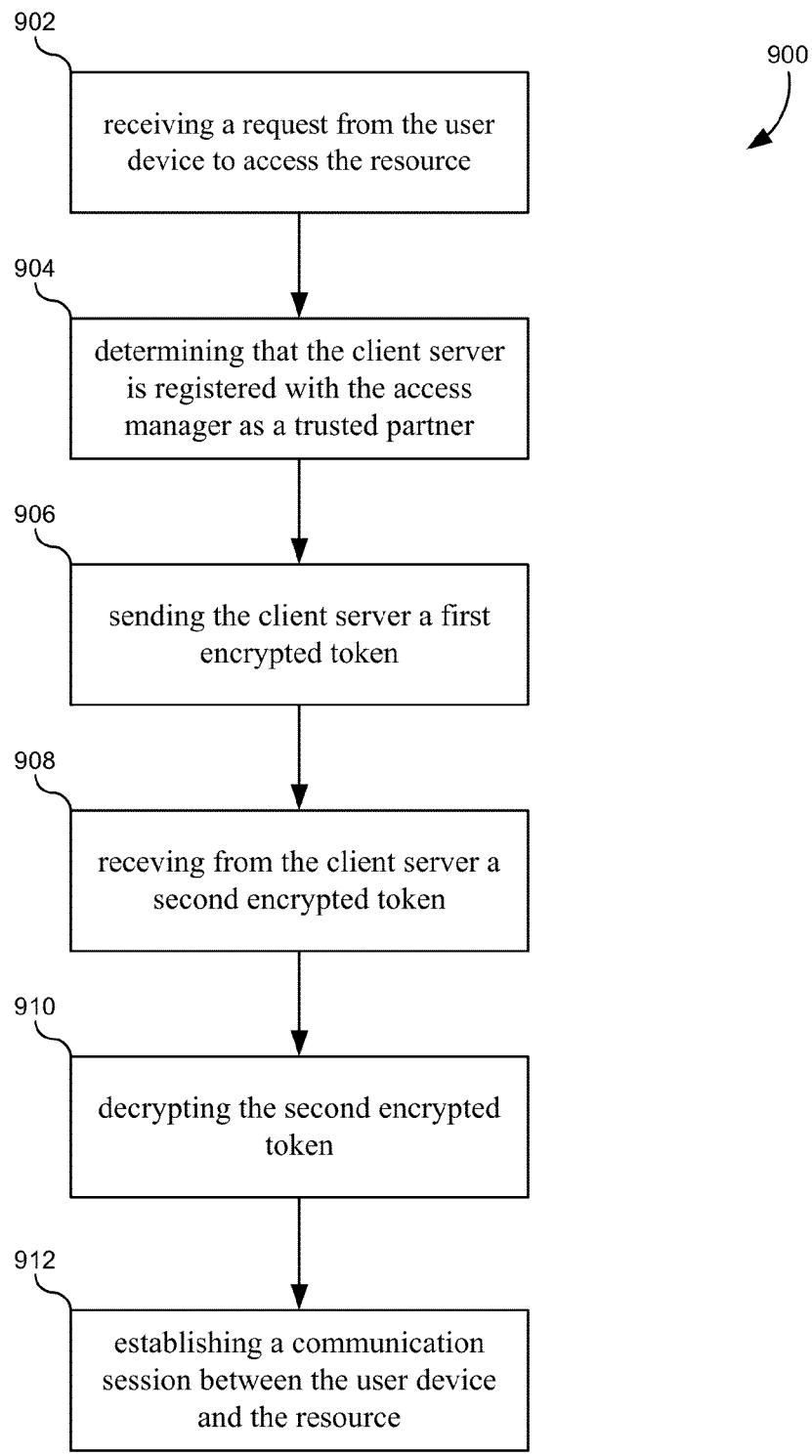
FIG. 9 illustrates a flowchart of a method for using trusted partner tokens, according to one embodiment.

FIG. 9 illustrates a flowchart of a method for using trusted partner tokens, according to one embodiment. In some cases, the registration process described above in relation to FIG. 8 may have already taken place. Therefore, the client system described in relation to FIG. 9 may have been previously registered as a trusted partner with the access manager server.

The method may include receiving a request from a user device to access a resource (902). In one embodiment, the user device operates external to an Enterprise Software System of which the access manager server is a part. In another embodiment, the user device comprises a workstation operating as part of the Enterprise Software System. The resource may include any digital resource, such as a database, a user profile, a web service, a hardware computing system, a software application, and/or the like.

The request may be received by the access manager directly, or may be routed to the access manager as it is received by a larger Identity Management Suite (IMS). The access manager may additionally determine whether a client system is associated with the resource. For example, a client system may, at least in part, control access to the resource. In one embodiment, the client system may comprise an identity management server, an Enterprise gateway, a mobile gateway, and/or the like. The client system may also include external systems such as a social network. The client system may also include internal systems that tangentially protect the resource, such as a fraud detection system. In one embodiment, the access manager may determine that the requested resource is specifically protected by a particular client system.

The method may also include determining that the client system is registered with the access manager as a trusted partner (904). This determination may be made by consulting a stored list of trusted partners, by examining a stored authentication scheme and matching an identifier with the client system, or by recognizing a unique communication from the client system using cryptographic information previously exchanged during a registration process. In another embodiment, the request from the user device may specify the client system protecting the resource.

The method may additionally include sending the client system a first encrypted token (906). The encrypted token may include information related to accessing the resource, such as a user identifier, a user device identifier, a start time, a request type, an authentication level, user attributes, information related to the communication channel, and/or the like. In one embodiment, the token may be very light weight, containing information only related to the authentication flows. Note that the first encrypted token is different from a cookie exchanged between a server and a client. The token need not persist after the session is over, whereas the purpose of a cookie is to maintain information between web sessions.

In one embodiment, the first encrypted token comprises a resource identifier. This identifier may be used by the client system to identify the requested resource. Also, the client system may have access to a first cryptographic key that can be used to decrypt the first encrypted token. In one embodiment, the first cryptographic key may include a symmetric key exchanged during the registration process. In another embodiment, the first cryptographic key may include a private key from a public/private key pair associated with the client system.

The method may further include the access manager receiving a second encrypted token from the client system (908). The second encrypted token may include information associated with a user profile, such as a username, a user identifier, an e-mail, user attributes, a screen name, a photograph, and/or the like. The second encrypted token may also include security information that has been verified by the client system. In one embodiment, the second encrypted token may signify that access to the resources that has been granted by the client system. Therefore, receiving the second encrypted token and verifying that it can be decrypted at the access manager server signifies that the user device provided the necessary credentials and received authorization to access the resource (although the access manager may still need to assert the user identity). In another embodiment, the second encrypted token may also include information regarding the status of the security request, such as whether authentication was successful, whether credentials were supplied, and/or whether access should be granted.

In some cases, the second encrypted token may be encrypted such that a second cryptographic key can be used to decrypt the second encrypted token. For example, the access manager may have access to a symmetric encryption key exchanged during the registration process. The access manager may also have access to a private key associated with a public key by which the second encrypted token was encrypted. In one embodiment, the second encrypted token may also include a specific user identifier, such as a username, that may be recognized by the access manager server. The username may be asserted by the access manager server in order to establish a communication session.

In one embodiment, the client system can make a request to the user device for credentials. The user credentials may include a username and password, a PIN, a hardware system configuration verification, a hardware dongle, providing a challenge to the user to be signed by the user device, and/or the like. A secure communication channel may be established between the user device and the client system during the authentication process. The client system may authenticate the credentials provided by the user device using stored information at the client system. Therefore, the information used to authenticate the credentials may reside at the client system without exposing this information to the access manager server.

The method may also include decrypting the second encrypted token (910). After decryption, the access manager may extract all the information included in the second encrypted token and possibly use that information to assert a user's identity. The method may also include establishing a communication session between the user device and the resource (912). In one embodiment, the communication session may also include the access manager through which communications are passed. In another embodiment, the commutation session may comprise a direct link between the user device and the client system and/or the resource. The communication session may be associated with a start time, an end time, a timeout, and other security measures that can be used to automatically disconnect the session after an approved/idle time interval has expired. Information relating to the duration of the communication session may be transmitted from the client system to the access manager server as part of the second encrypted token.

It will be understood that communication sessions between the user device and other resources may also be established at the same time as a communication session between the user device and a first resource. In other words, the user device may access multiple resources protected by the access manager and wired to multiple client systems at the same time. Therefore, the method may also include receiving a second request from the user device to access a second resource. Access to the second resource may be controlled at least in part by a second client system that is different from the first client system protecting the first resource. In one embodiment, both the first client system and the second client system are part of the same Enterprise Software System as the access manager server. In other embodiments, one or both of the first client system and the second client system may be external to the Enterprise Software System.

The method may additionally include determining whether the second client/server is registered with the access manager as a trusted partner, and sending the second client/server a third encrypted token. The third encrypted token may be similar to the first encrypted token sent to the first client system. Next, the access manager may receive a fourth encrypted token from the second client system signifying that access to the second resources been granted by the second client system. The access manager server may then decrypt the fourth encrypted token and establish a second communication session between the user device and the second resource.

It should be appreciated that the specific steps illustrated in FIGS. 8-9 provide particular methods of using trusted partner tokens according to various embodiments of the present invention. Other sequences of steps may also be performed according to alternative embodiments. For example, alternative embodiments of the present invention may perform the steps outlined above in a different order. Moreover, the individual steps illustrated in FIGS. 8-9 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 10:
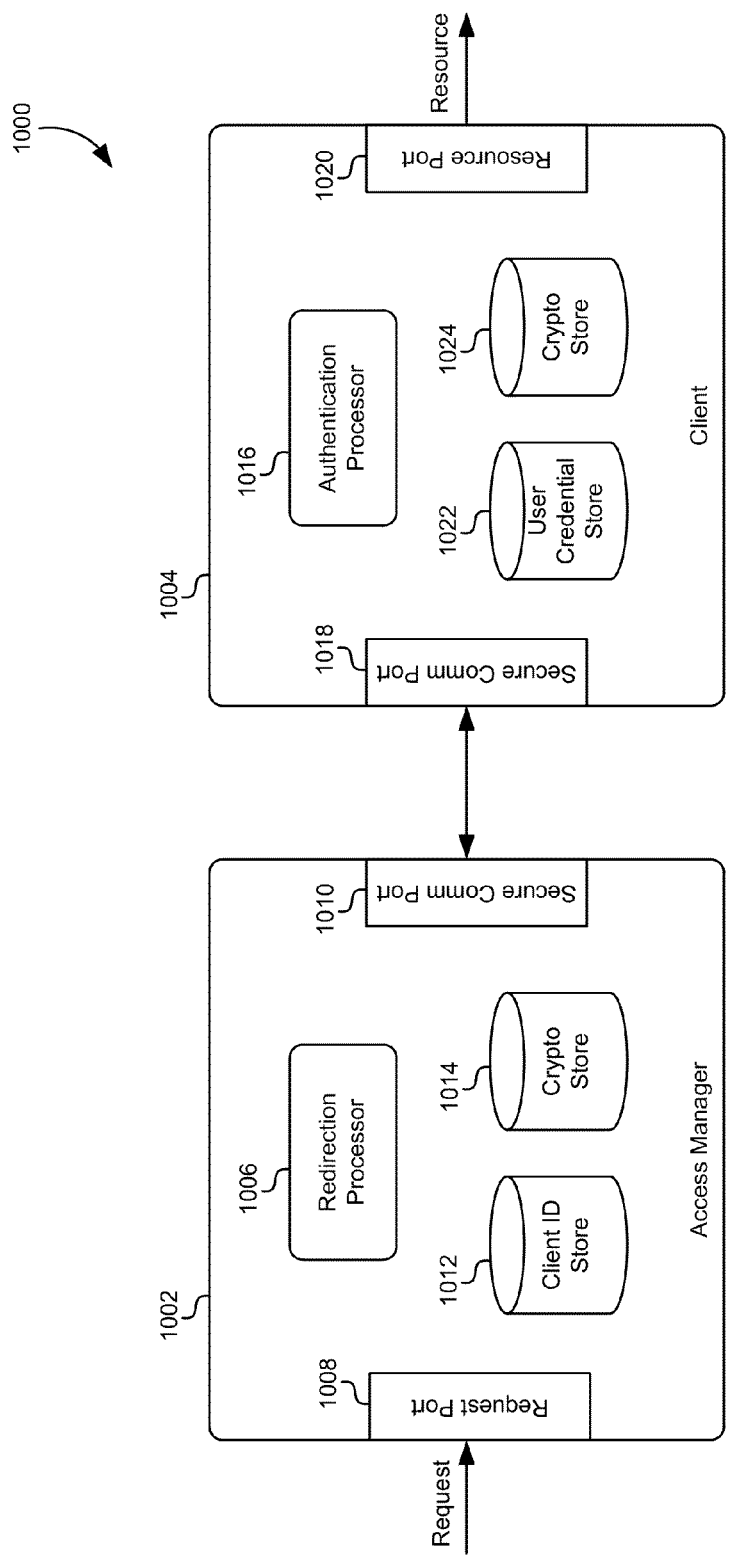
FIG. 10 illustrates a block diagram of a trusted partner system, according to one embodiment.

FIG. 10 illustrates a block diagram of a trusted partner system, according to one embodiment. Note that in some embodiments, the methods described above may be implemented using general purpose computer systems, such as computer system 200 illustrated in FIG. 2. In this embodiment, however, the methods described above may be implemented in a specialized computer hardware system that is designed to carry out the steps of the methods described above. This specialized hardware system may be constructed using digital and analog circuits that are well-known in the art, including those computer elements described in relation to FIG. 2.

An access manager server 1002 may be constructed from computer hardware to include a request port 1008 that is configured to receive requests for resources from user devices. The access manager server 1002 may also include a secure communication port 1010 configured to communicate securely with one or more client systems. The access manager server 1002 may also include a client ID store 1012. The client ID store 1012 may be implemented using any physical memory device, and may be configured to operate as a database storing client system IDs that are registered as trusted partners. The access manager server 1002 may also include a cryptographic information store 1014 that is configured to store cryptographic information, such as public, private, and/or symmetric encryption keys. The cryptographic information store 1014 may be implemented using specialized hardware that protects the information stored thereon from unauthorized access. The access manager server 1002 may also include a redirection processor 1006 is configured to receive requests from the request port 1008, package information into tokens that can be encrypted using information from the cryptographic information store 1014, and pass that information to client systems through the secure communication port 1010. The redirection processor 1006 may also be configured to receive encrypted tokens from the secure communication port 1010, decrypt those tokens, and establish communication sessions between user devices and client systems.

In some embodiments, a client system may be designed from hardware similar to the access manager server. A client system 1004 may include a secure communication port 1018 similar to that of the access manager server 1002. The client system 1004 may also include a resource port 1020 used to provide access to the requested resource. Similar to the access manager server 1002, the client system 1004 may also include a cryptographic information store 1024. The cryptographic information store 1024 may also be implemented using a memory device that is protected against unauthorized access. The client system 1004 may also include a user credential store 1022. The user credential store 1022 may be implemented using any hardware device, and may be configured to store information used to authenticate user credentials provided from a user device. Furthermore, the client system 1004 may be constructed to include an authentication processor 1016 that can be provided with a set of instructions that cause the authentication processor 1016 to encrypt and decrypt tokens passed between the client system 1004 and the access manager server 1002. The authentication processor 1016 may also receive credentials from user devices and authenticate those credentials using information from the user credential store 1022.

In one embodiment, the various modules and systems in FIG. 10 may reside on separate computer systems. Alternatively, multiple modules may be combined on the same or similar computer systems. In addition, some modules may be combined together into a single module performing the functions of both individual modules. Similarly, a single module may be split into multiple modules. It will be understood in light of this disclosure that any arrangement of the modules, as well as any implementation in both software and hardware, may be used by various embodiments.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of using an access manager to establish a communication session between a resource and a user device, the method comprising:
   receiving, by the access manager, and from the client system, a registration transmission comprising a client system identifier, wherein:
      the client system comprises a software module that is a part of an Enterprise Software System (ESS); and
      the access manager server is a part of the same ESS;
   registering the client system with the access manager as a trusted partner to indicate that future authentications by the trusted partner within the ESS do not require a trusted third party, wherein the registering comprises:
      sending a first cryptographic key to the client system; and
      storing, at the access manager:
         a second cryptographic key that is assigned to client system;
         a trusted partner authentication scheme for the client system; and
         a trusted partner identifier that identifies the client system;
   receiving, by the access manager, and from the user device, a request to access the resource, wherein access to the resource is controlled at least in part by the client system;
   determining, by the access manager, that the client system is part of the ESS and registered with the access manager as a trusted partner;
   determining the trusted partner identifier for the client system;
   accessing the second cryptographic key using the trusted partner identifier;
   encrypting, by the access manager, a first encrypted token using the second cryptographic key, wherein:
      encrypting the first encrypted token using the second cryptographic key indicates to the client system that the access manager is a trusted partner; and
      the first encrypted token comprises a resource identifier that identifies the resource; and
   sending, to the client system, and from the access manager, the first encrypted token;
   receiving, by the access manager, and from the client device, a second encrypted token comprising a user identifier, wherein:
      the second encrypted token signifies that the client system requested, received, and authenticated user credentials directly from the user device and that access to the resource has been granted by the client system; and
      the user credentials are requested, received, and authenticated by the client system transparently such that the user device is not aware that an entity other than the access manager requested, received, and authenticated the user credentials;
   determining whether the second encrypted token is received from a trusted partner by attempting to decrypt the second encrypted token using the second cryptographic key; and
   if it is determined that the second encrypted token is received from a trusted partner, establishing, by the access manager, the communication session between the user device and the resource by asserting the user identifier.

2. The method of claim 1 further comprising:
   receiving a second request from the user device to access a second resource, wherein access to the second resource is controlled at least in part by a second client system;
   determining that the second client system is registered with the access manager as a trusted partner;
   sending the second client system a third encrypted token;
   receiving from the second client system a fourth encrypted token, wherein the fourth encrypted token signifies that access to the second resource has been granted by the second client system;
   decrypting a the fourth encrypted token; and
   establishing a communication session between the user device and the second resource.

3. The method of claim 1 further comprising redirecting the user device to the resource after the communication session has been established.

4. The method of claim 1 wherein the first cryptographic key and the second cryptographic key comprise a same symmetric cryptographic key.

5. The method of claim 1 wherein the first cryptographic key and the second cryptographic keys are each part of a public/private key pair.

6. The method of claim 1 wherein the first encrypted token further comprises an authentication level.

7. The method of claim 1 wherein the first encrypted token further comprises a time associated with the request.

8. The method of claim 1 wherein the second encrypted token further comprises an email address.

9. The method of claim 1 wherein the access manager is communicatively coupled to a fraud detection server.

10. The method of claim 1 wherein the access manager is communicatively coupled to an identity management server.

11. The method of claim 1 wherein the client system comprises a social network.

12. A non-transitory computer-readable memory having stored thereon a sequence of instructions which, when executed by one or more processors, causes the one or more processors to use an access manager to establish a communication session between a resource and a user device by:
   receiving, by the access manager, and from the client system, a registration transmission comprising a client system identifier, wherein:
      the client system comprises a software module that is a part of an Enterprise Software System (ESS); and
      the access manager server is a part of the same ESS;
   registering the client system with the access manager as a trusted partner to indicate that future authentications by the trusted partner within the ESS do not require a trusted third party, wherein the registering comprises:

sending a first cryptographic key to the client system; and storing, at the access manager:
a second cryptographic key that is assigned to client system;
a trusted partner authentication scheme for the client system; and
a trusted partner identifier that identifies the client system;

receiving, by the access manager, and from the user device, a request to access the resource, wherein access to the resource is controlled at least in part by the client system;

determining, by the access manager, that the client system is part of the ESS and registered with the access manager as a trusted partner;

determining the trusted partner identifier for the client system;

accessing the second cryptographic key using the trusted partner identifier;

encrypting, by the access manager, a first encrypted token using the second cryptographic key, wherein:
encrypting the first encrypted token using the second cryptographic key indicates to the client system that the access manager is a trusted partner; and
the first encrypted token comprises a resource identifier that identifies the resource; and sending, to the client system, and from the access manager, the first encrypted token;

receiving, by the access manager, and from the client device, a second encrypted token comprising a user identifier, wherein:
the second encrypted token signifies that the client system requested, received, and authenticated user credentials directly from the user device and that access to the resource has been granted by the client system; and
the user credentials are requested, received, and authenticated by the client system transparently such that the user device is not aware that an entity other than the access manager requested, received, and authenticated the user credentials;

determining whether the second encrypted token is received from a trusted partner by attempting to decrypt the second encrypted token using the second cryptographic key; and if it is determined that the second encrypted token is received from a trusted partner, establishing, by the access manager, the communication session between the user device and the resource by asserting the user identifier.

13. A system comprising:
one or more processors; and
a memory communicatively coupled with and readable by the one or more processors and having stored therein a sequence of instructions which, when executed by the on or more processors, cause the one or more processors to use an access manager to establish a communication session between a resource and a user device by:
receiving, by the access manager, and from the client system, a registration transmission comprising a client system identifier, wherein:
the client system comprises a software module that is a part of an Enterprise Software System (ESS); and
the access manager server is a part of the same ESS;
registering the client system with the access manager as a trusted partner to indicate that future authentications by the trusted partner within the ESS do not require a trusted third party, wherein the registering comprises:
sending a first cryptographic key to the client system; and
storing, at the access manager:
a second cryptographic key that is assigned to client system;
a trusted partner authentication scheme for the client system; and
a trusted partner identifier that identifies the client system;

receiving, by the access manager, and from the user device, a request to access the resource, wherein access to the resource is controlled at least in part by the client system;

determining, by the access manager, that the client system is part of the ESS and registered with the access manager as a trusted partner;

determining the trusted partner identifier for the client system;

accessing the second cryptographic key using the trusted partner identifier;

encrypting, by the access manager, a first encrypted token using the second cryptographic key, wherein:
encrypting the first encrypted token using the second cryptographic key indicates to the client system that the access manager is a trusted partner; and
the first encrypted token comprises a resource identifier that identifies the resource; and sending, to the client system, and from the access manager, the first encrypted token;

receiving, by the access manager, and from the client device, a second encrypted token comprising a user identifier, wherein:
the second encrypted token signifies that the client system requested, received, and authenticated user credentials directly from the user device and that access to the resource has been granted by the client system; and
the user credentials are requested, received, and authenticated by the client system transparently such that the user device is not aware that an entity other than the access manager requested, received, and authenticated the user credentials;

determining whether the second encrypted token is received from a trusted partner by attempting to decrypt the second encrypted token using the second cryptographic key; and if it is determined that the second encrypted token is received from a trusted partner, establishing, by the access manager, the communication session between the user device and the resource by asserting the user identifier.

14. The non-transitory computer-readable memory according to claim 12, wherein the instructions further cause the one or more processors to use an access manager to establish a communication session between a resource and a user device by redirecting the user device to the resource after the communication session has been established.

\* \* \* \* \*

UNITED STATES PATENT AND TRADEMARK OFFICE
CERTIFICATE OF CORRECTION

| | | |
|---|---|---|
| PATENT NO. | : 8,856,517 B2 | Page 1 of 1 |
| APPLICATION NO. | : 13/686543 | |
| DATED | : October 7, 2014 | |
| INVENTOR(S) | : Balakrishnan et al. | |

It is certified that error appears in the above-identified patent and that said Letters Patent is hereby corrected as shown below:

On the Title Page, item (72) inventors, line 2, delete "Vikas Pooven Chathath" and insert -- Vikas Pooven Chathoth --, therefor.

In the Drawings

On Sheet 4 of 10, in figure 4, under Reference Numeral 402, line 2, delete "Mananger" and insert -- Manager --, therefor.

In the Specification

In column 2, line 17, delete "a the" and insert -- the --, therefor.

In column 9, line 53, delete "a an" and insert -- an --, therefor.

In the Claims

In column 18, line 29, in Claim 2, delete "a the" and insert -- the --, therefor.

In column 19, line 55, in Claim 13, delete "on" and insert -- one --, therefor.

Signed and Sealed this
Fourth Day of August, 2015

Michelle K. Lee
*Director of the United States Patent and Trademark Office*